Oct. 11, 1932.  F. H. HEITGER  1,881,562
AUTOMATIC CHARGE HEATING CONTROL FOR INTERNAL COMBUSTION ENGINES
Filed Aug. 15, 1929  2 Sheets-Sheet 1
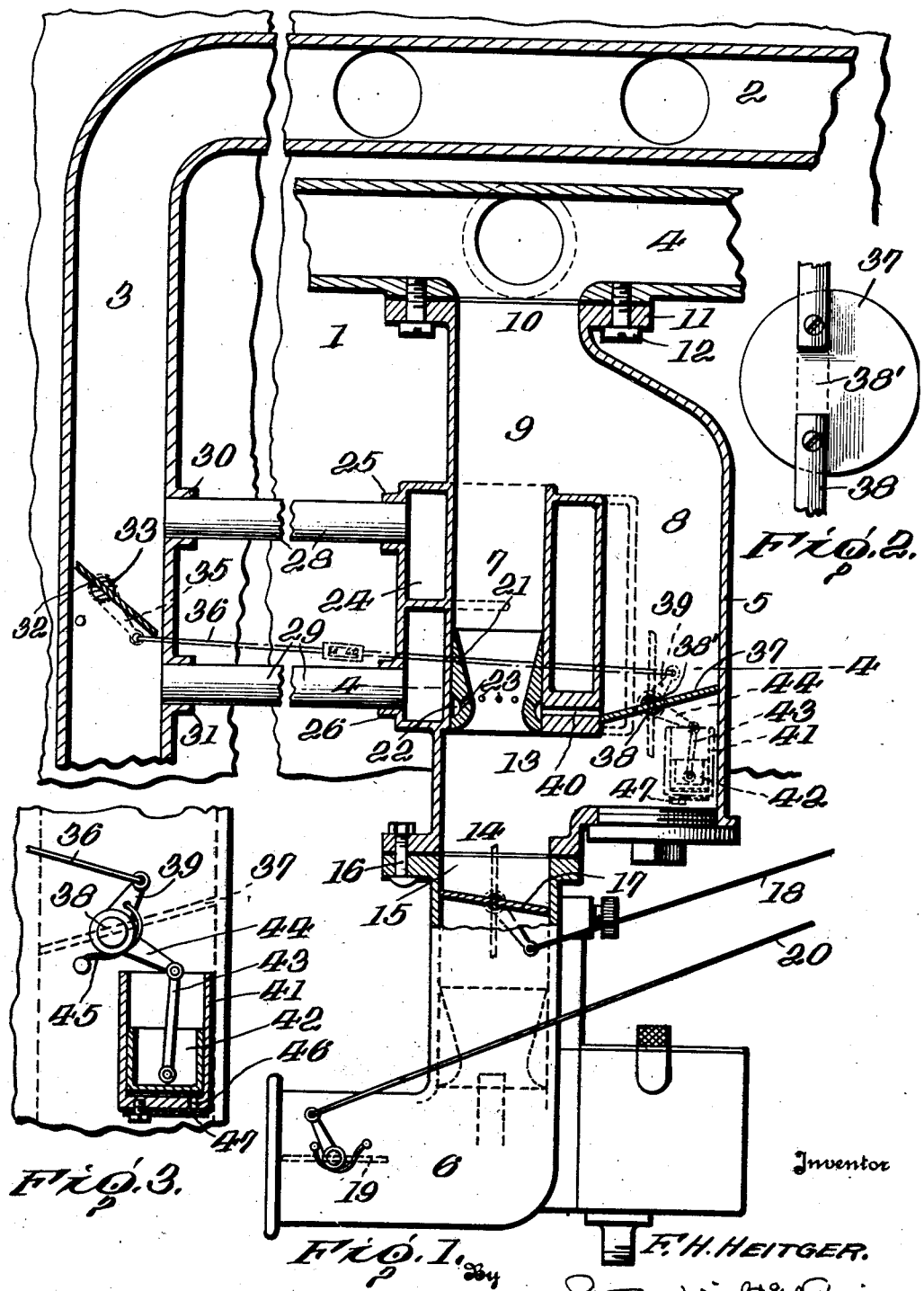

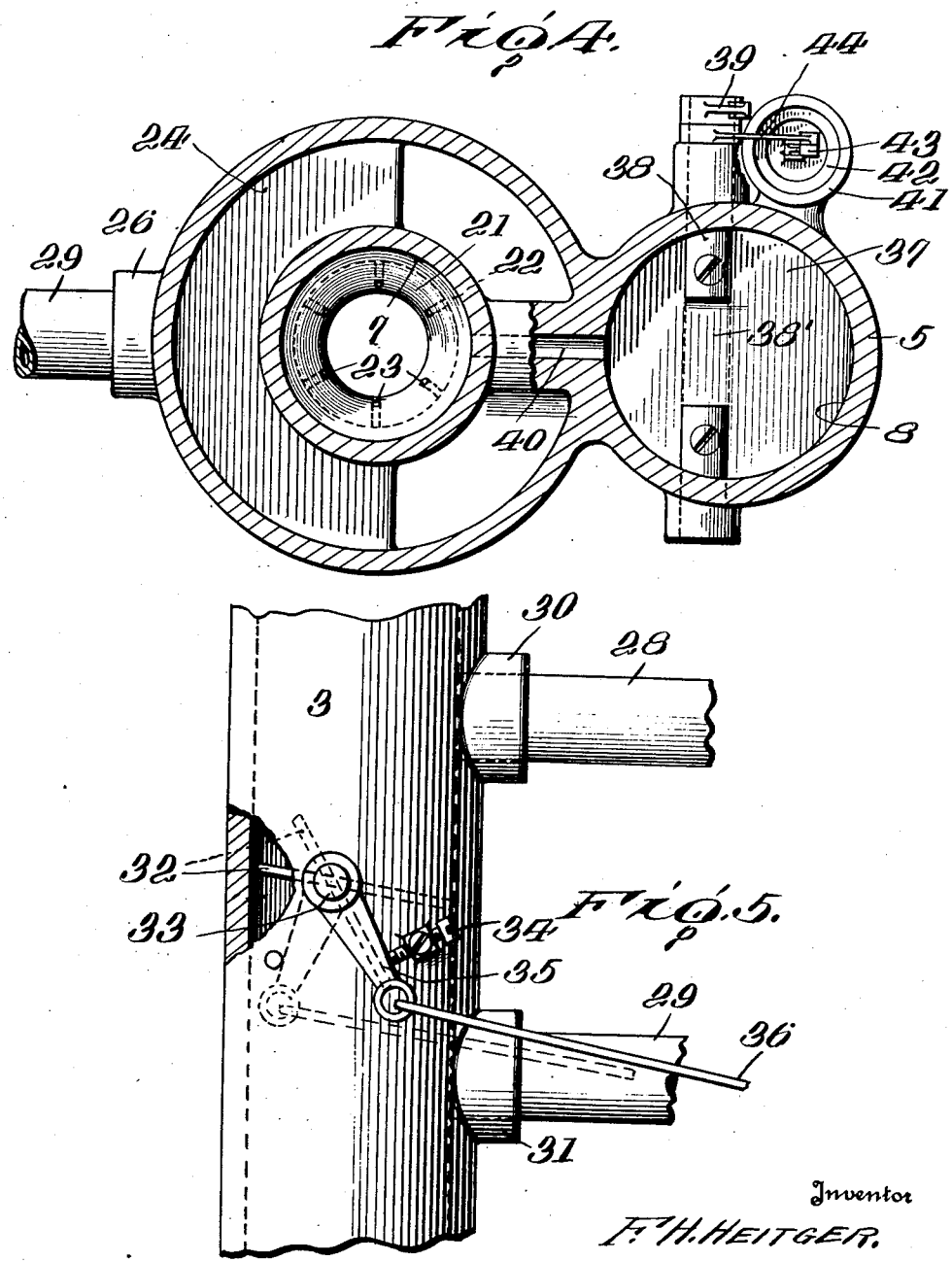

Patented Oct. 11, 1932

1,881,562

UNITED STATES PATENT OFFICE

FRANK H. HEITGER, OF FLINT, MICHIGAN

AUTOMATIC CHARGE HEATING CONTROL FOR INTERNAL COMBUSTION ENGINES

Application filed August 15, 1929. Serial No. 386,175.

This invention relates to an automatic charge heating control for internal combustion engines, the object being to provide a manifold which is adapted to be placed between the distributing manifold of an internal combustion engine and the charge forming device with passages of different sizes, the smaller passage being provided with means for heating the same controlled by a suction operated valve arranged in the larger passage.

Another object of my invention is to provide novel means for preventing the sudden opening of the suction controlled valve even though carbureter throttle be suddenly opened in the form of a dash pot having an air vent closed by a thermostatic valve so that the opening movement of the suction controlled valve is resisted by a partial vacuum in the dash pot.

Another and further object of the invention is to provide novel means for collecting the heavy or unvaporized particles of fuel that may enter the unheated or large passage when the valve therein is closed delivering the same into the heated passage at the point of greatest depression.

Another and further object of the invention is to provide a manifold which is capable of being used in connection with any of the well known forms of distributing manifolds and charge forming devices now in use, the same being disposed between the charge forming device and the distributing manifold so that all the fuel mixture under certain throttle positions of the carbureter or vacuum will pass into and through the heated passage and under other positions a portion of the more homogeneous fuel mixture will pass through the unheated passage, the heated passage being disposed in vertical alignment with the outlet of the charge forming device so that the heavier particles by their own inertia will pass into the heated passage while the lighter or vaporized particles will pass into and through the unheated passage according to vacuum conditions.

Other and further objects and advantages of the invention will be hereinafter set forth and the novel features thereof defined by the appended claims.

In the drawings,

Figure 1 is a vertical section, partly in elevation, of an automatic charge heating control for internal combustion engines constructed in accordance with my invention;

Figure 2 is a top plan view of a suction controlled valve;

Figure 3 is a detail vertical section of the dash pot showing the thermo reed valve in position for closing the vent;

Figure 4 is a horizontal section through the heated and unheated passage taken on line 4—4 of Figure 1; and Figure 5 is a side elevation partly in section showing the normal position of the exhaust valve unseated and the stop and adjusting screw for setting the valve in its proper position.

In the embodiment of my invention as herein shown, 1 indicates an internal combustion engine, 2 the exhaust manifold, 3 the exhaust pipe leading therefrom, 4 a distributing manifold, 5 an intermediate manifold and 6 a charge forming device herein shown of the plain tube type, it, of course, being understood that any of the well known types of charge forming devices now in use can be used in connection with my improved construction of control without departing from the spirit of my invention.

In constructing an intermediate manifold in accordance with my invention as herein shown, I provide large and small passages 7 and 8 which communicate at the upper end in a chamber 9 which terminates in an outlet 10 having flanges 11 connecting the same to the distributing manifold 4 by suitable bolts 12. The lower ends of the passages 7 and 8 communicate with a chamber 13 which is provided with an inlet 14 connected to the outlet 15 of the charge forming device by any suitable means. As herein shown, the inlet and outlet of the intermediate manifold and charge forming device are provided with abutting flanges between which is arranged a gasket, said flanges being secured together by bolts 16.

The charge forming device 6 is provided with a throttle valve 17 controlled by an operating rod 18 and a choker valve 19 controlled by a control rod 20 in the usual manner. The passage 7 is arranged directly over the outlet of the charge forming device and has secured therein a Venturi tube 21 having an annular chamber 22 formed in its outer wall provided with openings 23 extending into the interior of the venturi.

The passage 7 is surrounded by a heating chamber 24 which is provided with an inlet nipple 25 and an outlet nipple 26 in which are secured the ends of pipes 28 and 29 which are secured with outlet and inlet nipples 30 and 31 formed in the exhaust pipe 3 in order to allow the exhaust gases to be by-passed out of their natural path of travel through the exhaust pipe into the heating chamber 24 and back into the exhaust pipe 3 through the pipe 29. A valve 32 is disposed within the exhaust pipe between the nipples 30 and 31 for throttling or by-passing the exhaust gases, said valve being carried by shaft 33 preferably mounted off center of the bore and is adapted to be held slightly open by any suitable means when in a supposed closed position, such as a stop 34 which can be provided with the usual adjusting screw 34' for setting the valve in order to hold it partially open. The shaft 33 carries an arm 35 to which is connected a link 36 for the purpose hereinafter fully described, and which has a turn buckle adjusting means to adjust the length of 36.

By mounting the shaft off center in the bore and having the valve mounted on the shaft, the pressure on the valve balances the friction of the shaft to enable it to be more easily moved by the suction operated valve.

Mounted within the passage 8 is a suction controlled valve 37 which is mounted off center on a shaft 38 so as to be unbalanced and by having different areas of the valve to each side of the shaft, the suction has a tendency to open said valve. The shaft 38 carries an arm 39 to which the link 36 is connected in such a manner that when the suction operated valve 37 is moved into open position, the exhaust throttling valve 32 will be moved into open position in order to allow the exhaust gases to pass freely through the exhaust pipe without being diverted out of their natural path of travel.

The shaft 38 of the suction operated valve is cut away as shown at 38' so as to allow the heavier particles of fuel which may accumulate within the passage 8 when valve 37 is closed to be delivered into a passage 40 which communicates with the annular chamber 22 so that these heavier particles which collect on the valve will be drawn by suction into the venturi and be delivered into passage 7.

In order to provide means for preventing the sudden opening of the suction operated valve 37, I have shown one form of retarding means in the form of a dash pot comprising a cylinder 41 in which is mounted a free working piston 42 having a piston rod 43 which is connected to an arm 44 fixed on the shaft 38 of the suction operated valve 37 whereby a partial vacuum will be produced within the cylinder to retard the opening of the suction controlled valve. The piston can be calibrated according to weight in order to normally hold the suction operated valve and the exhaust throttling valve into closed position or as herein shown, a spring 45 can be employed which has a connection with the arm 39 of the shaft so as to normally rock the shaft in order to hold these valves in closed position and I am aware that various other ways of accomplishing this result can be used without departing from the spirit of my invention.

While I have described a dash pot action for resisting the opening movement of the valve, the construction shown is substantially the reverse of the ordinary action of what is known commonly as a dash pot and I am aware that a chamber with a movable wall operated by a valve may be used so as to resist the opening movement of the valve and in the construction shown a dash pot action is obtained on the closing of the valve.

In order to control the movement of the piston within the dash pot so as to control the opening movement of the suction controlled valve, I provide the cylinder with a vent 46 which is closed by a thermostatic element 47 so that when the engine is cold to which the device is attached, the vent will be closed in order to cause a partial vacuum to be created within the cylinder as the valve tends to open by suction and after the engine has been heated and reached its proper thermostatic condition, the valve will normally remain open so that the suction controlled valve is free to move. The construction of thermostatic element as herein shown is in the nature of a reed valve and by mounting the same as shown, the piston is free to move downwardly and is retarded in its upward movement when venturi is closed by thermostatic valve.

I have found by tests that at low speeds, say 150 revolutions per minute, the carbureter throttle valve can be closed fully one-half way and not impair the power, and that the mixture can also be heated at low speeds with benefit and as the load on the motor is gradually released, allowing the speed to increase, that the carbureter throttle can be gradually opened to compensate for the increase of speed and at a certain range of speed, the heat can be gradually shut off, and the valve 37 functions as a slow opening throttle. When the engine is cold and is at low speed, the valves are in the position shown and the charge produced in the charge forming device passes through the passage 7 to the distributing manifold and as the speed increases, the suction operated valve 37 is acted on by the suction produced by the engine so as to open the passage 8 and at the same time open the exhaust throttling valve 32, which allows the gases to seek the path of least resistance.

The charge produced by the charge forming device passes through both the passages at certain vacuum stages, the heavier or unvaporized particles by their own inertia are drawn into the passage 7 and heated and the other lighter particles of the mixture pass through the passage 8 to where they are mingled in chamber 9 and then delivered to the distributing manifold.

The size of the venturi in the passage 7 is such that it will satisfy the motor power requirements at a low range of motor speed, throttle wide open, and when its capacity is reached, the suction operated valve in the unheated passage 8 will start to open and at the same time the suction operated valve starts to open, the exhaust throttling valve 32 will start to open and as the load becomes less and the speed increases, the suction operated valve 37 opens wider and wider so that at maximum speed and power both valves are wide open.

From the above it will be seen that I have provided a manifold with passages of different sizes, one of which is heated and one of which is unheated so that at common road speed, part throttle, all the fuel mixture is heated or at full throttle and low range of speed, the heating effect being continued until the suction controlled valve 37 starts to open.

While in the drawings I have shown certain details of construction, I do not wish to limit myself to any particular manner of forming an automatic charge heating control for internal combustion engines as I am aware that various changes can be made without departing from my invention which consists broadly in providing two passages for the fuel, one being provided with a suction operated valve controlling the flow of the fuel mixture thereto and specifically in providing an intermediate manifold with a heated and an unheated passage, the unheated passage being provided with a suction controlled valve for controlling the passage of exhaust gases utilized for heating the heated passage in connection with means for retarding and controlling the opening of the suction controlled valve as to temperature.

What I claim is:

1. The combination with an internal combustion engine, of a manifold having passages of different sizes, a charge forming device having an outlet in alignment with the small passage, a heating chamber surrounding said passage, and a suction operated valve in one of said passages for controlling the passage of the heating medium to said heating chamber.

2. The combination with an internal combustion engine having a distributing manifold, of an intermediate manifold provided with a small and a large passage, a charge forming device connected to said intermediate manifold, a heating chamber surrounding said small passage, a valve for diverting a heating medium of said engine through said heating chamber and a suction operated valve within the large passage for operating said valve.

3. The combination with an internal combustion engine, of a manifold having a heated and an unheated passage and a suction operated valve arranged in the unheated passage for controlling the application of the heating medium to said heated passage.

4. The combination with an internal combustion engine, of a manifold having a heated and an unheated passage, a suction operated valve controlling the application of heating medium to said heated passage and means for resisting the opening movement of said suction controlled valve.

5. The combination with an internal combustion engine, of a manifold for said engine having passages of different sizes, means for heating one of said passages and means controlled by the suction of the other passage controlling the application of heating medium.

6. The combination with an internal combustion engine, of a manifold having spaced passages, one of said passages being normally closed by a suction controlled valve, a heating chamber for heating the constantly open passage and means operated by the suction operated valve for diverting the exhaust gases of said engine out of their natural path of travel through said heating chamber.

7. A manifold for internal combustion engines having spaced passages, a suction operated valve in one of said passages, and means constructed to produce a partial vacuum during the opening movement of said valve for resisting the movement thereof.

8. A manifold for internal combustion engines having spaced passages, a suction operated valve in one of said passages, a dash pot constructed to produce a partial vacuum for resisting the opening movement of said valve and thermostatic means controlling the vacuum in said dash pot.

9. A manifold for internal combustion engines having a heated and an unheated passage and suction operated valve disposed in the unheated passage for collecting the unvaporized particles of fuel from said unheated passage and delivering said particles into the heated passage.

10. A manifold for internal combustion engines having a heated and an unheated passage through which the fuel mixture passes before being delivered to the engine, a Venturi tube arranged within the heated passage and a suction operated valve disposed in the unheated passage for conveying unvaporized particles of fuel from said unheated passage and delivering said particles into the throat of said venturi.

11. A manifold for internal combustion engines having a heated and an unheated passage, a Venturi tube arranged within the heated passage, a suction opened valve arranged within the unheated passage, means for conveying unvaporized particles of fuel from said unheated passage and delivering said particles into the throat of said Venturi, and means controlled by said suction valve controlling the application of heat to said heated passage.

12. A manifold for internal combustion engines having a heated and an unheated passage, a Venturi tube arranged within the unheated passage, a suction valve arranged within the unheated passage, means for conveying unvaporized particles of fuel from said unheated passage and delivering said particles into the throat of said venturi, means controlled by said suction controlled valve controlling the application of heat to said heated passage, and a dash pot for resisting the opening movement of said suction controlled valve.

13. The combination with an internal combustion engine having an exhaust manifold, exhaust pipe and a distributing manifold, of an intermediate manifold connected to the distributing manifold having a charge forming device connected thereto, said intermediate manifold being provided with spaced passages, a valve arranged within the exhaust pipe, a heating chamber surrounding one of said passages in communication with said exhaust pipe to each side of said valve and a suction operated valve within the unheated passage of said manifold having a connection with the first mentioned valve for causing the products of combustion to be diverted out of their natural path of travel through said heating chamber.

14. The combination with an internal combustion engine, of a manifold having a chamber at each end and passages in communication with said chambers, a heating chamber surrounding one of said passages, a charge forming device connected to said manifold a suction operated valve in one of said passages and means operated by said suction operated valve for causing the heating medium to circulate through said heating chamber.

15. The combination with an internal combustion engine, of a manifold having a chamber at each end and passages in communication with said chamber, a heating chamber surrounding one of said passages, a charge forming device connected to said manifold, a suction operated valve in one of said passages, means operated by said suction operated valve for causing the heating medium to circulate through said heating chamber and means for resisting the opening movement of said suction operated valve.

16. A manifold for internal combustion engines having spaced passages, a suction operated valve arranged in one of said passages for normally closing the same, a chamber having a movable wall connected with said suction operated valve for resisting the opening movement thereof, said chamber having a vent and a thermostatically operated valve for closing said vent when cold.

17. The combination with an internal combustion engine having a manifold provided with passages of different sizes, means for heating the smaller passage, a suction operated valve for controlling the passage of fuel through the larger passage, means operated by said suction operated valve for controlling the application of heating medium to said heating means and a dash pot for resisting the opening movement of said suction controlled valve.

18. The combination with an internal combustion engine, of a manifold having passages of different sizes and a suction operated valve arranged in the larger passage for controlling the flow of fuel therethrough and thermostatic controlled means for resisting the opening movement of said valve.

In testimony whereof I hereunto affix my signature.

FRANK H. HEITGER.